United States Patent
Wu et al.

(10) Patent No.: US 7,813,434 B2
(45) Date of Patent: Oct. 12, 2010

(54) SYSTEMS AND METHODS FOR IMPROVED BIT LOADING FOR DISCRETE MULTI-TONE MODULATED MULTIPLE LATENCY APPLICATIONS

(75) Inventors: Yan Wu, Morganville, NJ (US); Lujing Cai, Morganville, NJ (US); William Scholtz, Red Bank, NJ (US); Ehud Langberg, Wayside, NJ (US)

(73) Assignee: Ikanos Communications, Inc., Fremont, CA (US)

( * ) Notice: Subject to any disclaimer, the term of this patent is extended or adjusted under 35 U.S.C. 154(b) by 254 days.

(21) Appl. No.: 11/559,772

(22) Filed: Nov. 14, 2006

(65) Prior Publication Data

US 2007/0110176 A1    May 17, 2007

Related U.S. Application Data

(60) Provisional application No. 60/735,877, filed on Nov. 14, 2005.

(51) Int. Cl.
  *H04K 1/10* (2006.01)
  *H04L 27/28* (2006.01)
(52) U.S. Cl. .................................... 375/260
(58) Field of Classification Search ............... 375/260
  See application file for complete search history.

(56) References Cited

U.S. PATENT DOCUMENTS 5,479,447 A  12/1995  Chow 6,205,410 B1 * 3/2001 Cai ........................... 702/191
6,711,207 B1 * 3/2004 Amrany et al. ............ 375/222

FOREIGN PATENT DOCUMENTS

WO    WO 01/20865    3/2001

OTHER PUBLICATIONS

Matthew J. Langlois, "ADSL Tutorial", Master's Project, University of New Hampshire, May 2002.*
International Preliminary Examination Report.
"TCP Performance Analysis and Optimization Over DMT based ADSL Systems," He et al., Department of Electrical Engineering The Pennsylvania State University, University Park, PA, USA, 2001, IEEE.
International Search Report and Written Opinion.

* cited by examiner

*Primary Examiner*—David C Payne
*Assistant Examiner*—Nader Bolourchi
(74) *Attorney, Agent, or Firm*—Thomas, Kayden, Horstemeyer & Risley, LLP

(57) ABSTRACT

Systems and methods for performing bit loading in a dual latency data transmission system. In a computer network, such as an XDSL-based network, carrier channels are allocated between two latency paths. Error sensitive information is transmitted over a latency path employing one or more forward error correction techniques. Latency sensitive information that is relatively more tolerant of errors is transmitted over the other latency path. Rather than employing the lowest coding gain for carrier channels having the two different latency paths, the highest coding gain for each path is used by applying different target S-N-R margins for carrier channels having different latency paths.

20 Claims, 3 Drawing Sheets

SYSTEMS AND METHODS FOR IMPROVED BIT LOADING FOR DISCRETE MULTI-TONE MODULATED MULTIPLE LATENCY APPLICATIONS

CROSS-REFERENCE TO RELATED APPLICATION

This application claims priority to, and the benefit of, U.S. Provisional Patent Application entitled, "Systems and methods for improved bit-loading for discrete multi-tone modulated multiple latency applications," having Ser. No. 60/735,877, filed on Nov. 14, 2005, which is incorporated by reference in its entirety.

High-speed data communication paths are typically required in order to make high data rate services, such as video and Internet access, available to end users. Fiber optic communication paths are well suited for these high data rate services, but are not readily available in existing communication systems and are expensive to install. Therefore, data transfer technology which can operate with little modification to existing telephone wiring connection (e.g., twisted-pair copper lines) has been developed for providing high data rate services.

Since copper lines are widely available and developed, solutions to the high speed access problem were originally focused on improving the performance of voice-band modems, which operate at the subscriber premises end over a 3 kHz voice band and transmit signals through the public switching telephone network (PSTN). The phone company network treats them exactly like voice signals. These modems presently transmit up to 56 kb/s over 2-wire telephone line, even though the practical speed was 1.2 kb/s only twenty years ago. The improvement in voice band-modems over the past years has resulted from significant advances in algorithms, digital signal processing, and semiconductor technology. Because such modems are limited to voice bandwidth (3.0 kHz), the rate is bound by the Shannon limit, that is, the theoretical limit of error-free digital data that can be transmitted over a communication link with a specified bandwidth in the presence of noise interference—in this case 3 kHz. Thus, current voice modems have probably maximized the theoretical speed limits at about 56 Kb/s. However, there is a considerable amount of bandwidth available in copper lines that has gone unused by voice-band modems, and this is why a proposal known as Asymmetric Digital Subscriber Loop (ADSL) was suggested in the industry as a high-speed protocol/connection alternative over twisted-pair copper lines. The practical limits on data rate in conventional telephone line lengths (of 24 gauge twisted pair) vary from 1.544 Mb/s for an 18,000 foot connection, to 51.840 Mb/s for a 1,000 foot connection. Since a large proportion of current telephone subscribers fall within the 18,000 foot coverage range (approximately 3.5 miles), ADSL can make the current copper wire act like a much "bigger pipe" for sending computer bits and digital information (like movies and TV channels), while still carrying the voice traffic. For example, an ADSL modem can carry information 200 times faster than the typical 56K voice band modem used today.

ADSL is "asymmetric" in that more bandwidth is allocated to downstream data (to the subscriber) than upstream (back from the subscriber). The reason for this is a combination of cost, cross-talk, speed demands, and performance. For example, twisted pair wire coupling increases with the frequency of the signal. If symmetric signals in many pairs are used within a cable, the data rate and line lengths become significantly limited by the coupling noise. Since the preponderance of target applications for digital subscriber services is asymmetric, asymmetric bit rate is not perceived to be a serious limitation at this time. Therefore, the ADSL standard proposes up to 6 Mb/s for downstream, and up to 640 kb/s for upstream. For example, video on demand, home shopping, Internet access, remote LAN access, multimedia access, and specialized PC services all feature high data rate demands downstream, to the subscriber, but relatively low data rates demands upstream. The principal advantage is that all of the high speed data operations take place in a frequency band above the voice band, leaving Plain Old Telephone Service (POTS) service independent and undisturbed, even if an ADSL modem fails. ADSL further provides an economical solution for transmission of high bandwidth information over existing copper line infrastructures.

In order to adjust for performance variations over the entire available spectrum, ADSL systems typically use discrete multi-tone (DMT) techniques (e.g., a multi-carrier technique) that divide the available bandwidth of twisted-pair copper lines into multiple channels or "bins." Using DMT, the available bandwidth is broken into a plurality of 4 kilohertz sub bands or tones and data is simultaneously transferred over several of the channels depending upon the transmission characteristics of each channel. For example, in conventional ADSL systems, the copper transmission line is divided into 256 DMT tones, separated by 4.3125 KHz, each with a different center frequency. Specifically, the T1E1.413 ADSL standard divides the available transmission bandwidth into two parts. At the lower 4 kHz band, ordinary (POTS) is provided. The bulk of the rest bandwidth in the range from 4 kHz to about 1 MHz is for data transmission in the downstream direction, which is defined to be from the exchange to the subscriber. The upstream control channel uses a 160 kHz band in between. The signals in each of these ranges can be extracted with an appropriate band-pass filter.

With DMT, a plurality of frames of a data stream is broken down into data blocks. Each data block is allocated to multiple carrier channels. A carrier channel, in turn, can be represented as a vector whose magnitude and phase is based on the data that the carrier channel is carrying and on the amount of bits that the carrier channel can support (sometimes referred to as "bit loading" or "tone ordering"). The bit loading of the carrier channel is indicative of the number of constellation points (e.g., the number of magnitude and phase combinations for the vector). Thus, if the bit loading of a particular carrier channel is 2, then the number of constellation points is 4, with a constellation point in each quadrant representing the binary number 00, 01, 10, or 11 for example. This process of associating binary numbers to constellation points is sometimes referred to as "constellation encoding" or "constellation mapping." Each of the carrier channel vectors may be used to produce a quadrature amplitude modulated (QAM) signal at a given frequency. Each channel uses QAM to carry 2 to 15 bits/QAM symbol. The QAM symbols are then summed to produce a time domain DMT "symbol" that is subsequently transmitted over the twisted-pair copper line. That is, each of the carriers that make up the DMT symbol contains a QAM signal. A DMT symbol is generated for each frame of the original data stream. This results essentially in overall performance which is equivalent to around two hundred V.34 modems used in parallel on the same line. Because each carrier channel can be configured to a different bit rate according to the channel characteristics, it can be seen that DMT is inherently "rate-adaptive" and extremely flexible for interfacing with different subscriber equipment and line conditions.

In typical DMT implementations, such as shown in U.S. Pat. No. 5,479,447 to Chow et. al., hereby incorporated by reference in its entirety, transmission power to the individual channels is initially configured based on the noise power and transmission loss in each band. In this way, channels with less noise and attenuation can carry larger amounts of data, while poorer sub-channels can be configured to carry fewer bits and can even be shut down entirely. Information on the transmission characteristics of each sub-channel is typically stored in a bit and energy table as discussed, for example, in U.S. Pat. No. 5,596,604 to Cioffi et. al. hereby incorporated by reference in its entirety.

Initial line conditions may vary after initialization because of temperature fluctuations, interference, etc. This can affect both the error rate and maximum data throughput. Therefore, by measuring the quality of each sub-channel on an ongoing basis, an "updated" bit and energy table may be maintained to adaptively configure the system for maximum data throughput or error performance on an ongoing basis. In normal applications, if the quality of any particular channel degrades to the point where the error performance of the system is compromised, one or more bits on that sub-channel are automatically moved to a sub-channel that can support additional bits.

To maximize the overall bit rate from the given channel characteristics and to achieve the target bit error rate (BER), a DMT codec needs to determine the number of bits for each QAM channel and allocate the output power within the standard's output power spectrum requirements. As discussed above, because the channel characteristics may vary as a function of time, the results of this bit allocation and power allocation process need to be updated constantly. The process of determining and dynamically adapting the optimal bit capacity output power for each sub-channel is generally referred to in the art as bit/energy loading and bit fine tuning respectively.

A good combined energy loading and bit fine tuning algorithm can optimize the system performance, as measured by considerations such as the overall data throughput rate, power margin, bit-error rate, and compliance with the T1E1.413 ADSL standard. Since there is a complex and nonlinear dependence between the power margin, bit allocation, and energy loading for each sub-channel, the computation may not necessarily converge. Therefore, it is critical for the energy loading and bit-fine tuning to rapidly converge and achieve the optimum bit allocation (i.e. maximum power margin) at the given target bit rate. Furthermore, the computation should be simple to minimize the computation time or hardware requirements.

The primary problem of the energy loading and bit allocation is explained below. First, at the given channel characteristic (i.e. channel transfer function and noise spectrum density), power margin, and bit error rate, the number of bits that can be used in QAM modulation is well known in the art and can be expressed by equation (1) as follows:

$$b_i = \log_2\left(1 + \frac{E_i|H_i|^2}{\gamma_m \gamma_b N_i}\right), \quad (1)$$

where $E_i$ is the energy (power/Hz) allocated to sub-channel i, $H_i$ is the value of the transfer function at the center frequency of sub-channel i, $\gamma_m$ is the power margin, $\gamma_b$ is the power gap required to achieve the specified bit error rate (e.g. 9.8 dB for BER of $10^{-7}$ in the theoretical limit), and $N_i$ is the noise power spectrum density at the center frequency of sub-channel i. Since $b_i$ in practice needs to be an integer, the T1E1.413 standard permits a.±−.0.3 dB variation of the output energy $E_i$ with respect to −40 dBm/Hz. From equation (1) it can be seen that the energy loading algorithm and bit allocation problem is to find a set of $E_i$ within the T1E1.413 requirements that can maximize the power margin $\gamma_m$ and at the same time achieve the target bit rate.

A variety of bit and energy loading methods are known in the art, such as, for example, those disclosed in U.S. Pat. No. 6,622, 282 to Djokovic et al., U.S. Pat. No. 6,807,234 to Hansen, and U.S. Pat. Nos. 6,084,917, 6,094,459, and 6.075, 821, each to Kao et al., the disclosures of which are all hereby incorporated by reference in their entireties.

In order to improve the accuracy and performance of broadband modems, manufacturers began to design system to segment data depending on its characteristics and to transmit the information differently based on this segmenting—that is, some information may be less tolerant of errors than of latency, such as voice for example, while other information may require the least error prone transmission but be generally tolerant of latency, such as data for example.

In recognition of the differing accuracy and latency requirements of different data types transmitted over high speed data lines, dual latency techniques have been developed. In dual latency, multiple data paths are established over the available DMT channels—a fast path which has minimal latency but may contain errors and an interleaved path incorporating various forward error correction techniques to reduce the bit error rate (BER) for applications that require accuracy over speed.

As noted above, the interleaved data path often employs one or more forward error correction (FEC) techniques which, while adding latency to the data transmission, reduce the BER of the transmitted data. Typically, this involves addition of redundant information to the basic data, also known as payload data. The data bytes and redundant bytes together form a unit called a codeword. Redundant bytes are generally added on to the data bytes to form the last bytes of the codeword. The number of frames in a codeword is user selectable and is dependent on the number of payload bytes in a frame and the maximum size of a codeword. As a result of using a forward error correction techniques, a group of redundancy bytes are added to the S frames of payload data to form a codeword having a length of N bytes, which equals the number of redundancy bytes (R) plus the aggregate number of basic data bytes (K) for the S frames of data. The redundant bytes allows a degree of error detection and correction at the receiving end of the communication system.

An enhancement of merely using a forward error correction scheme involves shuffling or interleaving the bytes of data before transmission, then unshuffling or deinterleaving the bytes at the receiving end. The purpose of interleaving is to ensure that bursts of noise during transmission do not cause too many errors in any individual codeword. If noise affects a particular frame of data, only a minimal number of bytes of data of any given codeword will be affected since bytes of a codeword will be spaced over many frames, each frame containing bytes from multiple codewords.

The type of interleaving used in ADSL communication systems is known as convolutional interleaving. Convolutional interleaving is controlled by two parameters: 1) the number of bytes to be interleaved (N), and 2) the depth of interleaving (D). Convolutional interleaving as applied to ADSL is defined in the American National Standard for Telecommunications-Network and Customer Installation Interfaces-ADSL Metallic Interface standard (T1E1.4-95-007R2)

by the following rule: each of the N bytes in a codeword ($B_0$, $B_1, \ldots B_{N-1}$) is delayed by an amount that varies linearly with the byte index. More precisely, byte $B_i$ is delayed by $(D-1)*i$ bytes.

Another forward error correction technique employed in DSL systems is Reed-Solomon coding. Reed-Solomon coding works by first constructing a polynomial of the data symbols to be transmitted and then sending an over-sampled plot of the polynomial instead of the original symbols themselves. Because of the redundant information contained in the over-sampled data, it is possible to reconstruct the original polynomial and thus the data symbols even in the face of transmission errors, up to a certain degree of error. The advantage of using Reed-Solomon codes is that the probability of an error remaining in the decoded data is (usually) much lower than the probability of an error if Reed-Solomon is not used. This is often described as the coding gain. For example, a digital communication system is designed to operate at a BER of $10^{-9}$, that is no more than 1 in $10^9$ bits are received in error. This can be achieved by boosting the transmission power or by adding Reed-Solomon or other FEC. Reed-Solomon allows the system to achieve this target BER with a lower transmitter output power. The power saving given by Reed-Solomon (in decibels) is the coding gain.

Yet another forward error correction technique employed in DSL systems is Trellis coding. The idea behind Trellis coding is that operations of modulation and coding are combined. The bandwidth is not expanded, that is, the symbol rate remains the same, but redundancy is introduced by using a constellation with more points than would be required without coding. The difference in signal-to-noise ratios between a coded and uncoded system of the same information rate that produced the same error probability is referred to as the coding gain. For a discussion of Trellis coded modulation refer to commonly assigned United States published patent application 2005/0010853 hereby incorporated by reference its entirety.

Because dual latency systems utilize different data paths having different properties, efficient bit-loading to take optimal advantage of the available channel capacity becomes complicated. Thus, there exists a need for an improved bit loading scheme in DMT dual latency application that reduces capacity losses due to sub-optimal bit-loading.

SUMMARY OF THE INVENTION

Thus, in view of the foregoing shortcomings and limitations of conventional dual latency systems an object of the embodiments of this invention is to provide systems and methods for improved bit loading in a DMT dual latency application that reduces capacity losses due to sub-optimal bit loading by using different coding gains on the different latency paths.

Another object of this invention is to provide a bit loading scheme for a DMT dual latency xDSL transceiver that applies different target SNR margins for sub-carriers that have different latency paths.

Thus, in order to achieve the above-noted objects various embodiments of the invention may provide a bit loading method for a multiple latency ADSL modem. The method according to this embodiment may comprise dividing an available bandwidth of a communication channel into a plurality of equal bandwidth sub-channels, determining the transmission characteristics of each sub-channel, allocating a number of bits for each sub-channel based on the step of determining, establishing at least two data paths from the sub-channels, wherein the data paths are characterized in having different target SNR margins, and simultaneously transferring bits of data over the at least two data paths.

Another embodiment according to this invention may provide an apparatus. The apparatus according to this embodiment may comprise first and second data processing paths, wherein the first and second data processing paths are each comprised of a plurality of individual carrier channels for carrying bits of information, and a constellation encoder unit coupled to receive outputs of the individual carrier channels of the first and second data processing paths and to generate signals corresponding to constellations representative of data contained in the carrier channels, wherein different target SNR margins are utilized for the carriers of the first and second data processing paths.

Yet another embodiment according to this invention may provide a chipset for an xDSL transceiver. The chipset according to this embodiment may comprise an interface to at least two information sources, wherein a first source generates information designated as latency intolerant and a second source generates information designated as error intolerant, at least two separate processing paths coupled to the at least two information sources, each processing path comprising a plurality of carrier channels for carrying bits of information from one of the at least two information sources, and a constellation encoder unit coupled to receive outputs of the at least two separate processing paths and to generate signals corresponding to constellations representative of the carrier channels to which the bits of information are assigned, wherein bit loading is performed such that different target SNR margins are utilized for the carrier channels carrying information designed as latency intolerant and error intolerant respectively.

These and other embodiments and advantages of the present invention will become apparent from the following detailed description, taken in conjunction with the accompanying drawings, illustrating by way of example the principles of the invention.

DETAILED DESCRIPTION

The following description is intended to convey a thorough understanding of the embodiments described by providing a number of specific embodiments and details involving systems and methods improved bit loading in a dual latency DMT-based xDSL communication system. It should be appreciated, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

As noted above, in dual latency DMT-based xDSL systems, two data paths are established over the available sub-channels, also referred to here in as carriers. Through this scheme, segregation is possible based on the particular service type being transmitted. For example, data and even video may be bit error rate (BER) sensitive but able to tolerate latency. Thus, in a dual latency system, when transmitting data or video the slower interleaved data path will be used. On the other hand, voice and gaming applications may be tolerant of higher BERs but intolerant of delays due to forward error correction (FEC). For such services, the fast data path will be used.

A problem arises when selecting the optimal bit loading scheme in a dual latency system. The conventional approach has been to use the lowest coding gain for all sub-carriers regardless of path. In other words, both the interleaved and fast data paths using the same coding gain, the coding gain of the fast data path. For example, in a dual latency system having an interleaved path characterized by a maximum Reed-Solomon coding (R=16), maximum interleaving depth (D.Itoreq.64) and Trellis coding, approximately a 5 dB coding gain is achieved. The fast data path in the same system has only a 3 dB Trellis coding modulation gain. Therefore, in this conventional system, bit loading is based on the lowest 3 dB gain of the fast channel. In such a system, the worst case capacity loss (based on 99% bandwidth allocation for interleaved path) for ADSL2+ downstream data (480 sub-carriers) is 480*(5.5-3)*4k/3=1600 kbps. This large loss is attributable to the fact that the bit loading is not based on the 5.5 dB coding gain even though nearly all the data is transmitted over the lower BER interleaved data path.

Figure 1:
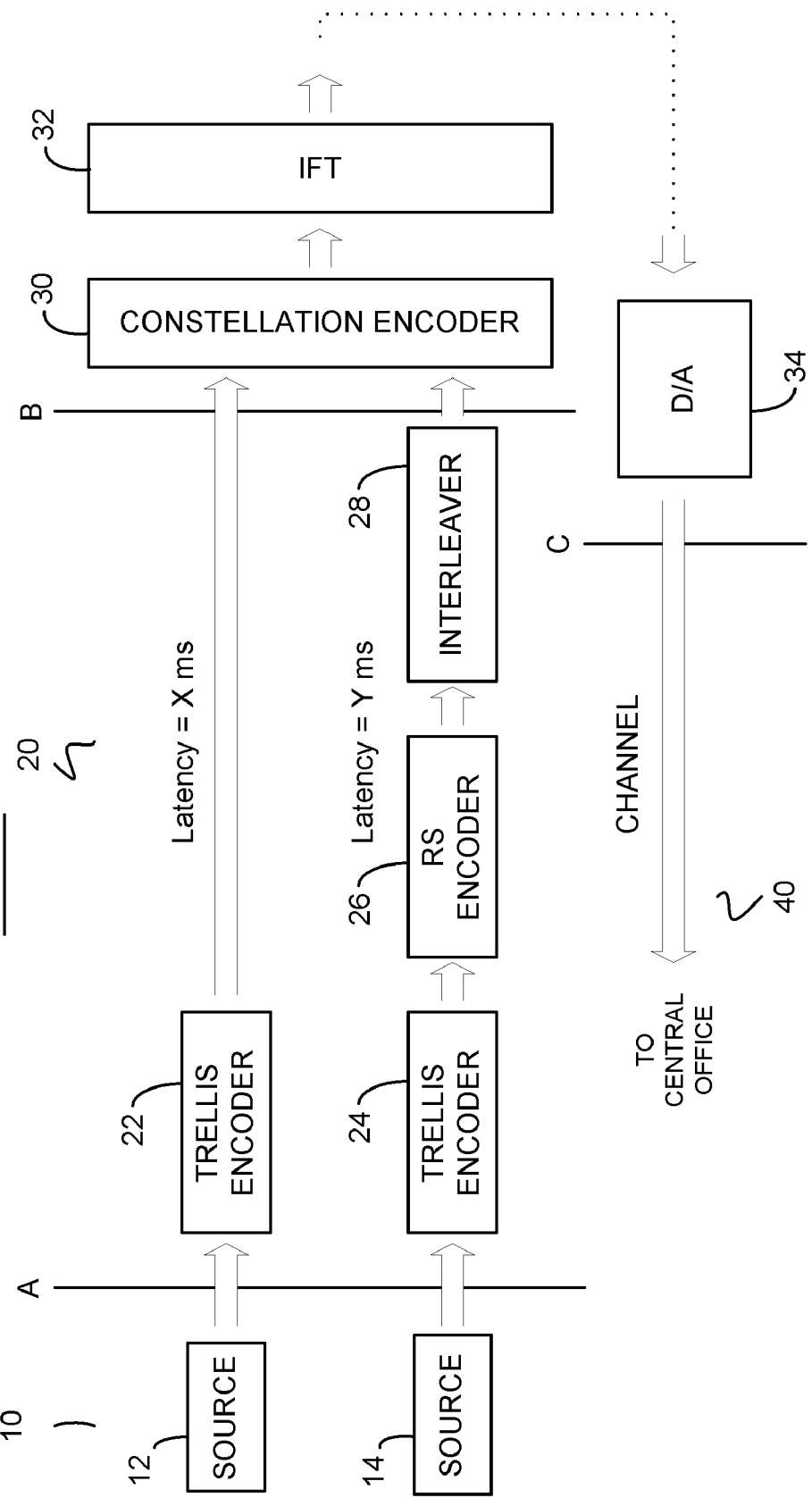
FIG. 1 is a block diagram illustrating a system for implementing at least one embodiment of the invention.

Referring now to FIG. 1, a block diagram illustrating a system for implementing at least one embodiment of the invention is depicted. The system includes sections divided by reference lines A, B and C. The system includes a data source section 10 which in various embodiments, may be a computer, telephone, storage medium, video and/or audio data source or other data source. The system also includes, in at least one embodiment, an DMT-based xDSL transceiver 20 configured to receive information from the data sources 10. For ease of explanation, operation of the system of FIG. 1 will be described in the context of a transmit mode of operation. However, it should be appreciated that the system may also operate in a receive mode of operation in which signal processing operations are performed in a substantially reverse manner to the transmit mode of operation.

As noted above, the system may include a plurality of information sources 10, such as, for example, a voice source 12 and data source 14. In various embodiments, a plurality of different information sources including voice, data, video, video gaming, or other types of information may be supplied to the reference line A. Reference line A is representative of the connection to the transceiver 20. In various embodiments, each of these information sources may provide information to the transceiver 20 in the form of asynchronous transfer mode (ATM) frames or cells, which are generated and sent to the transceiver 20 using known ATM techniques such as through a network interface card (NIC). In other embodiments, the information from one or more of the sources 10 may be sent to the transceiver 20 using formats and techniques other packet-based protocol.

In accordance with one embodiment of the invention separate processing paths may be provided to the transceiver 20 as illustrated in FIG. 1. In various embodiments, this may comprise separate physical connections to the transceiver 20 leading directly to the separate data paths, latency X and latency Y, as shown in the figure. Alternatively, in various embodiments, there may only be a single physical input to the transceiver 20 and hardware and/or software in the transceiver itself may direct the incoming information to one of the two data paths depending upon the designation of the data, that is, as latency or error sensitive.

In various embodiments, information entering the transceiver 20 at reference point A that is designated as being latency tolerant (i.e. error intolerant) will be sent over the latency Y data path. As seen in the figure, this data path may include one or more forward error correction (FEC) blocks such as Trellis coder 24 and Reed-Solomon coder 25. Any suitable FEC technique, such as those known in the art may be used. Additional detail of forward error correction can be found in International Telecommunicatoins Union—Telecommunication Standardization Sector, "Draft Recommendation: G.992.2—Splitterless Asymmetric Digital Subscriber Line (ADSL) Transceivers," June/July 1999.

In various embodiments, the latency Y path will also include an interleaver block 28. In various embodiments, the interleaver block 28 uses convolutional interleaving to interleave the codewords from the FEC blocks 24 and 26. An example of convolutional interleaving can be found in the aforementioned G.992.2 standards document. However, it should be appreciated that while current xDSL transceivers utilize convolutional interleaving other embodiments may utilize a different type of interleaving.

With continued reference to FIG. 1, the latency X data path contains only Trellis coder block 22 and may also be referred to as the fast or non-interleaved data path. Due to the lack of interleaving and additional FEC blocks, the latency X data path relatively faster than the latency Y data path. As noted herein, another consequence is that data transmitted through this path is relatively more likely to contain errors than the interleaved latency Y path. Thus, this path may be used for time sensitive, error tolerant applications such as voice or even video. It should be appreciated that while only two data paths are shown in the figure, the various embodiments of the invention may be used with multiple data paths, that is, more than two, such as, for example to handle the transmission of information that needs a combination of FEC and low latency that is between or even less or greater than the latency X and latency Y paths shown in the figure.

It should also be appreciated that the two data paths shown in the figure comprise an allocation of available carrier channels of the communication medium. Each carrier of the N available carriers corresponds to a sub-channel of the communication medium. The number of channels utilized in data transmission in a DMT-based xDSL system is usually determined during initialization between the customer premises transceiver and he central office transceiver. According to the ADSL ANSI T1.413 standard, the transceiver may utilize up to 256 channels separated by approximately 4 kilohertz. The first 32 channels in the range from 0 to approximately 138 kilohertz could be full duplex channels while the remaining 224 channels in the frequency range from 138 kilohertz to 1.1 megahertz are half duplex channels. Each loaded channel may support a minimum of 2 bits (4 unique binary numbers) to up to 15 bits (32,768 unique binary numbers) of QAM information. The actual number of bits a channel supports various due to the spectral response of the transmission line, such as, for example, in various embodiments, a twisted-pair copper plain old telephone service (POTS) line. The constellation encoder 30 iteratively loads bits onto available carriers.

Transmission channels are typically characterized by the channel's margin, signal-to-noise ratio gap (hereinafter SNR gap), and capacity. All are related concepts. The margin is the amount of additional signal-to-noise ratio in excess of the minimum required to achieve a given performance level for a particular type of modulation scheme with a particular SNR gap. The SNR gap is a function of a chosen probability of transmission error and the modulation and coding techniques. The SNR gap measures the inefficiency of the transmission method with respect to the best possible performance, assuming an additive white Gaussian noise channel. The SNR gap is often constant over a wide range of transmission rates which may be transmitted by the particular modulation coding technique. The channel capacity refers to the maximum data rate capable of being transmitted on a particular channel. The optimum line coding technique has a SNR gap of zero dB. Although such an optimum line code requires infinite decoding/encoding delay and is infinitely complex, it has become practical at typical Digital Subscriber Line (DSL) speeds to implement modulation methods to achieve SNR gaps as low as 1-2 dB. Therefore, one factor to be considered during the bit allocation process is the transmission quality of each sub-channel, in order to maximize the bit allocation for each subchannel As will be discussed in greater detail herein, the bit loading is performed such that different coding gains are applied to data in carriers allocated to the different latency paths. That is, to achieve more efficient allocation and reduce and ideally eliminate capacity loss due to using the lowest coding gain for all sub-carriers, a different target SNR margin is used for carriers allocated to different latency paths. Therefore, rather than using the lowest coding gain, such as, for example, the coding gain provided by the Trellis coder 22 of the non-interleaved path for carriers of both the interleaved and non-interleaved paths, this gain is only used for the fast carriers, while the higher coding gain provided by the combination of FEC and interleaving is used for the slow carriers avoiding channel capacity losses due to using the lowest coding gain for all carriers.

As noted above, before the data is encoded by the encoder block 30 and sent to the inverse Fourier transform (IFT) block 32 a bit loading table is preferably generated and utilized by the encoder 30. The bit loading table is calculated based on measured signal to noise ratio (SNR) in each sub-channel to allow optimal use of the channel's capacity. The bit loading table includes for each sub-channel, a number of bits that the particular sub-channel may support. In various embodiments, to construct a bit loading table, a wide band test signal may be sent over the transmission channel 40 between the remote transceiver 20 and the central office transceiver (not shown). The wide band test signal is sent using the maximum number of available sub-carriers (e.g., 256). Upon receipt of the wide band test signal, the signal is evaluated to determine the spectral response of the transmission channel, that is, the SNR curve along the spectrum of available sub-channels or carriers. The SNR for each sub-channel or carrier is often related to the number of possible bits that may be loaded onto a carrier. For instance, carriers having a relatively high SNR may carry more bits than carriers having a relatively lower SNR. Table 1 illustrates the calculated requirements to support the QAM constellations as defined by ANSI T1.413 with a bit error rate (BER) of $10^{-7}$ and zero margin. The margin characterizes how close the loaded carrier has come to its theoretical maximum for a given channel and its transmit energy. A margin of zero corresponds to an optimally loaded channel. Loading is limited by the ADSL standard to 2-15 bits per channel and the margin requirement or request is often determined during initialization. A typical margin requirement or request may be between 2.5 dB and 6 dB. For instance, if it is desired to load a carrier with two bits and the required margin is set at 6 dB then the SNR level must be at least 20.3203 dB according to Table 1. With a margin of 6 dB, the carrier may tolerate 6 dB of channel noise, before the BER for the data loaded on that carrier becomes greater than $10^{-7}$. The current bit loading method in the ADSL/ADSL2/2+ standard uses a flat target margin for all the carriers. As noted herein, this will cause a capacity loss problem when dual or multiple latency carriers share the same physical channel. Since the coding gains are different for each latency path, using the minimum coding gain for all the subcarriers is not optimal to the extent that it can result in significant capacity loss.

TABLE 1

| BITS | SNR (dB) | SNR with 6 dB margin |
|---|---|---|
| 2 | 14.3203 | 20.3203 |
| 3 | 19.1100 | 25.1100 |
| 4 | 21.3100 | 27.3100 |
| 5 | 24.4627 | 30.4627 |
| 6 | 27.5425 | 33.5425 |
| 7 | 30.5871 | 36.5871 |
| 8 | 33.6145 | 39.6145 |
| 9 | 36.6333 | 42.6333 |
| 10 | 39.6478 | 45.6478 |
| 11 | 42.6603 | 48.6603 |
| 12 | 45.6716 | 51.6716 |
| 13 | 48.6825 | 54.6825 |
| 14 | 51.6930 | 57.6930 |
| 15 | 54.7035 | 60.7035 |

Varying SNR levels for carriers often result from channels having more or less attenuation than other channels and also due to channel specific noise disturbances such as interference of an AM radio station, near end cross talk (NEXT), and far end cross talk (FEXT). If channel attenuation is too great or noise level is too high, the channel may be deactivated. In addition, as the transmission line is lengthened, increased channel attenuation may occur and as a result less bit loading may occur on the influenced channels possibly leading to transmission of a smaller frame size (the frame is the amount of bits transmitted by all of the loaded carriers). The total number of bits transmitted in one frame is the sum of the bits carried by all of the active carriers.

Figure 2:
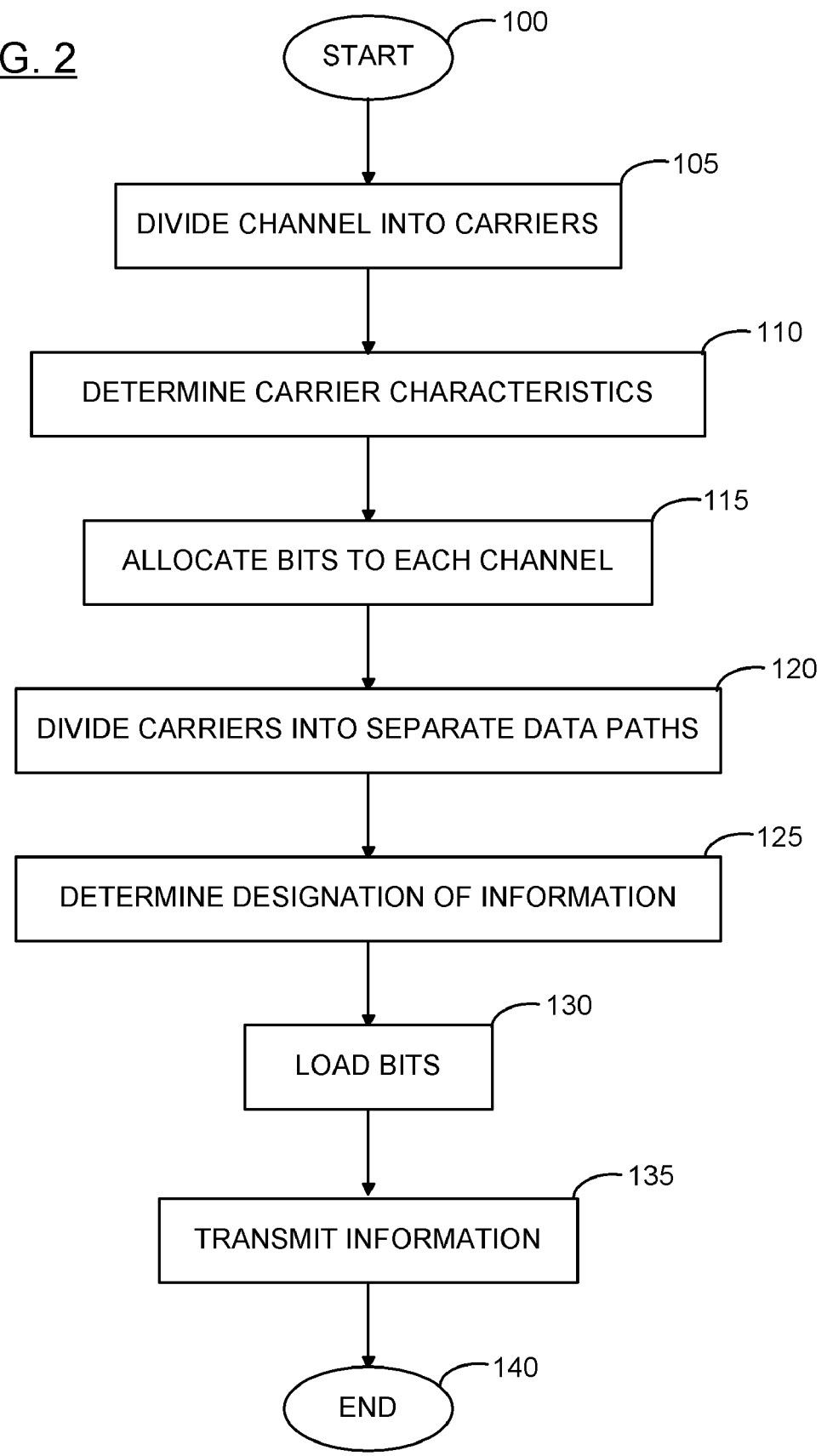
FIG. 2 is a flow chart depicting a method for transmitting information in a dual latency DMT-based xDSL transceiver employing improved bit loading according to at least one embodiment of the invention.

Referring now to FIG. 2, this figure is flow chart highlighting the steps of a method for transmitting information in a dual latency DMT-based xDSL transceiver employing improved bit loading according to at least one embodiment of the invention. The method begins in step 100 and advances to step 105 wherein the channel is divided into a plurality of sub-channels or carriers. As discussed herein, in the ANSI T1.413 standard there are 256 channels. However, it should be appreciated that less or even more channels may be used with the various embodiments of the invention in accordance with different standards or protocols.

Next, in step 110, the characteristics of the sub-channels or carriers are determined. As discussed herein, transmission channels are typically characterized by the channel's margin, signal-to-noise ratio gap (hereinafter SNR gap), and capacity. This step typically results in a response curve that reflects the SNR on each channel. Then in step 115, the characteristic information is used to calculate a bit and energy table whereby a number of bits between 2 and 15 are allocated to each channel. Next, in step 120, based on current requirements, the available carrier bandwidth is divided into two data paths. As discussed herein, bit loading for the carriers allocated to the fast data path (non-interleaved) is based on a different target SNR margin and different coding gain than the bit loading for the carriers allocated to the slower (interleaved) data path.

In step 125, upon receipt of outbound information at the transceiver device a determination is made as to whether the information is designated as latency or error intolerant so that the data can be transmitted through the appropriate latency path. As noted herein, this step may result in a determination that the information is designated as both which causes a third data path to be chosen having a latency between that of the interleaved and non-interleaved paths of the transceiver 20 illustrated in FIG. 1.

Next, in step 130, bit loading is performed with the appropriate target SNR margin based on the determining of step 125. In step 135, the data bits are transferred from the transceiver over the communication channel. In various embodiments, this step comprises first converting the encoded data into an analog signal to be transferred to a transceiver device at the service provider's central office, usually within 18,000 line feet of the transmitting device. Operation of the method ends in step 140.

Figure 3:
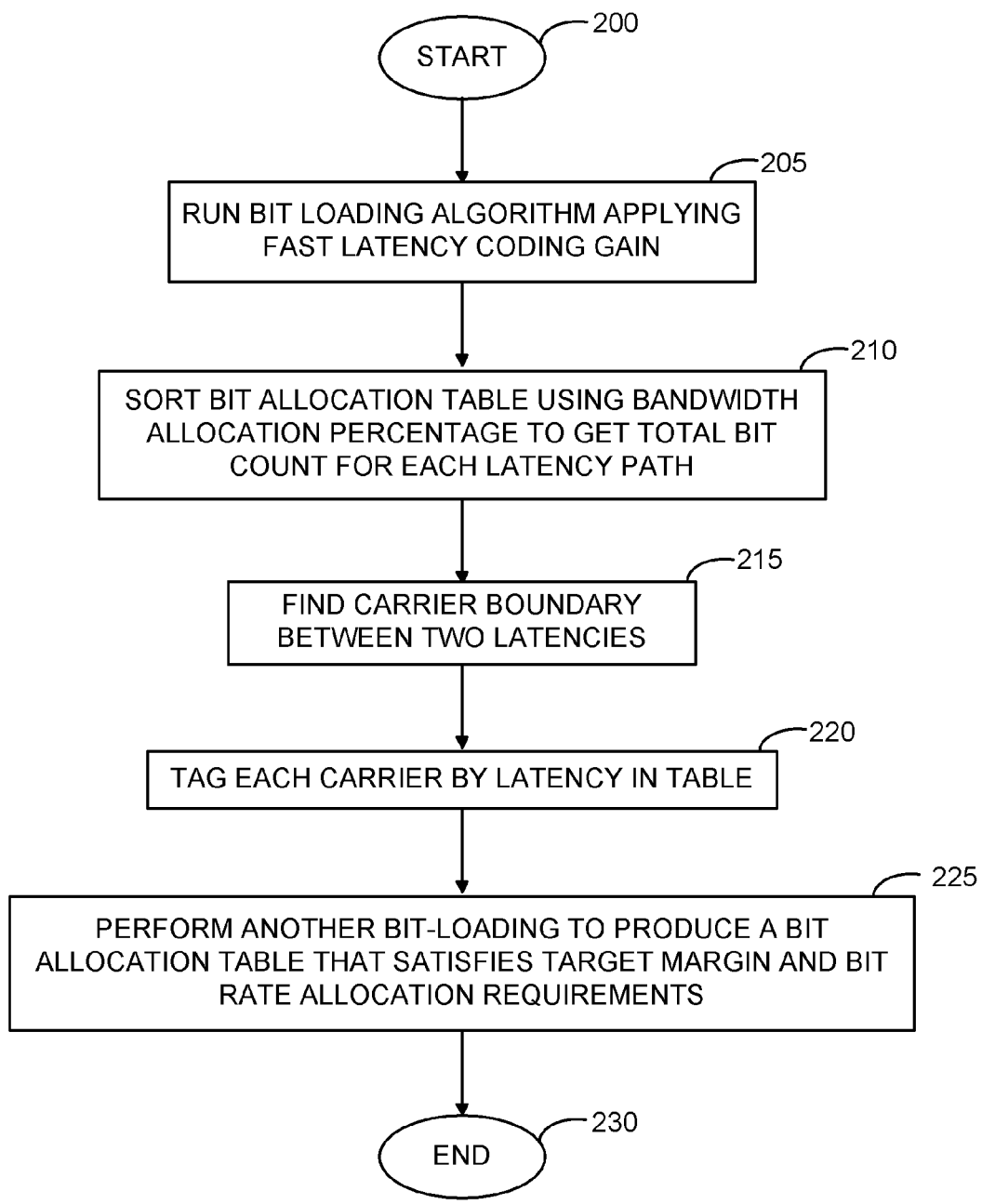
FIG. 3 is a flow chart depicting a method for performing optimal bit loading in accordance with at least one embodiment of the invention.

Referring now to FIG. 3, a flow chart outlining the steps of a method of for applying a different coding gain to sub-carriers that carry different latency paths according to at least one embodiment of the invention is depicted. The method begins in step 200 and proceeds to step 205 where a bit loading algorithm is run by applying the coding gain associated with the fast latency data path across the SNR table. This results in an output of the total number of bits available and a bit allocation table for each sub-carrier in the channel. Next, in step 210, a total bit count is obtained for each latency path by sorting the bit allocation table derived in step 205 in ascending order, that is, in terms of the number of bits available in each channel. Then, in step 215, the sub-carrier boundary in the bit table between the two latencies is found. In various embodiments, each sub-carrier will be labeled as either fast or slow depending on which latency path it is allocated to. Next, in step 220, starting with the sub-carrier carrying the most bits the coding gain of the interleaved path is applied to load bits for all slow sub-carriers. Then, in step S225, another bit loading designated as fixed-bit loading is performed to generate a bit allocation table that satisfies target margin and bit rate allocation requirements. Also, in this step, the gain table Gi is rec-calculated to maintain the sum $(gi^2)=1$.

The embodiments of the present inventions are not to be limited in scope by the specific embodiments described herein. For example, although many of the embodiments disclosed herein have been described with reference to bit loading in a dual latency DMT-based xDSL transceiver, the principles herein are equally applicable to other aspects of multiple latency systems. Indeed, various modifications of the embodiments of the present inventions, in addition to those described herein, will be apparent to those of ordinary skill in the art from the foregoing description and accompanying drawings. Thus, such modifications are intended to fall within the scope of the following appended claims. Further, although some of the embodiments of the present invention have been described herein in the context of a particular implementation in a particular environment for a particular purpose, those of ordinary skill in the art will recognize that its usefulness is not limited thereto and that the embodiments of the present inventions can be beneficially implemented in any number of environments for any number of purposes. Accordingly, the claims set forth below should be construed in view of the full breath and spirit of the embodiments of the present inventions as disclosed herein.

The invention claimed is:

1. A bit loading method for a multiple latency xDSL transceiver comprising:

dividing a communication channel into a plurality of equal bandwidth sub-channels;

determining transmission characteristics of each sub-channel;

establishing at least two data paths from the sub-channels based on an identified boundary between the sub-channels associated with the data paths, wherein the data paths are characterized in having different target SNR margins; and allocating a number of bits for each sub-channel based on the transmission characteristics of each sub-channel, wherein the transmission characteristics comprise signal-to-noise ratio (SNR) gap, and capacity of each sub-channel and the SNR margin associated with the data path containing the sub-channel;

directing bits of data to the data paths based on whether the bits of data are latency sensitive and based on the different target SNR margins such that different coding gains are applied to data in carriers allocated to the at least two data paths; and simultaneously transferring the bits of data over the at least two data paths.

2. The method according to claim 1, wherein determining the transmission characteristics of each sub-channel comprises determining at least one characteristic selected from the group consisting of noise, echo, power and signal-to-noise ratio.

3. The method according to claim 1, wherein allocating a number of bits for each sub-channel comprises performing a bit loading algorithm.

4. The method according to claim 1, wherein establishing at least two data paths from the sub-channels comprises establishing at least a relatively fast data path and a relatively slower data path.

5. The method according to claim 4, wherein establishing a relatively slow data path comprises establishing a data path comprising at least one forward error correction (FEC) technique selected from the group consisting of Reed-Solomon coding, interleaving, and Trellis coding.

6. The method according to claim 4, wherein establishing a relatively fast data path comprises establishing a data path having a relatively higher bit error rate than the relatively slower data path.

7. The method according to claim 4, wherein establishing a relatively fast data path and a relatively slower data path comprises establishing data paths having different coding gains, wherein the sub-channels on the relatively slower data path have a higher coding gain than sub-channels on the relatively fast data path.

8. The method according to claim 4, wherein the establishing a relatively fast data path and a relatively slower data path comprises applying different target noise margins to sub-channels carrying different latency paths.

9. The method according to claim 4, wherein data corresponding to error sensitive applications is transferred over the relatively slower data path.

10. The method according to claim 5, wherein data corresponding to latency sensitive application is transferred over the relatively faster data path.

11. An apparatus comprising:

first and second data processing paths, wherein the first and second data processing paths are each comprised of a plurality of individual carrier channels for carrying bits of information;

a transceiver device for receiving data from one or more information sources, wherein the transceiver device determines whether the data is latency intolerant, error intolerant so that the data is transmitted through an appropriate latency path among the first and second data processing paths; and a constellation encoder unit coupled to receive outputs of the plurality of individual carrier channels of the first and second data processing paths and to generate signals corresponding to constellations representative of data contained in the plurality of individual carrier channels, wherein the constellation encoder unit utilizes different target SNR margins for the plurality of individual carrier channels of the first and second data processing paths based on an identified sub-carrier boundary in a bit table associated with the first and second data processing paths.

12. The apparatus of claim 11, wherein the constellation encoder unit further comprising circuitry adapted to determine for each carrier channel at least one characteristic selected from the group consisting of noise, echo, power and signal-to-noise ratio.

13. The apparatus of claim 11, wherein the constellation encoder unit allocates a number of bits for each carrier channel in accordance with a predetermined bit loading algorithm.

14. The apparatus of claim 11, wherein the first data path is a relatively fast data path and the second data path is a relatively slower data path.

15. The apparatus of claim 14, wherein the relatively slow data path comprises circuitry adapted to perform at least one technique selected from the group consisting of Reed-Solomon coding, interleaving, and Trellis coding.

16. The apparatus of claim 14, wherein the relatively fast data path is characterized in having a relatively higher bit error rate than the relatively slower data path.

17. The apparatus of claim 14, wherein the relatively fast and relatively slower data paths are characterized in having different coding gains, wherein the carriers on the relatively slower data path have a higher coding gain than carriers on the relatively fast data path.

18. A chipset for an xDSL transceiver comprising:
an interface to at least two information sources, wherein the interface designates whether data received from the at least two information sources is latency intolerant or error intolerant and routes the received data through an appropriate latency path;

at least two separate processing paths coupled to the at least two information sources through the interface, each processing path comprising a plurality of channels for carrying bits of information from one of the at least two information sources; and a constellation encoder unit coupled to receive outputs of the at least two separate processing paths and to generate signals corresponding to constellations representative of the plurality of carrier channels to which the bits of information are assigned, wherein bit loading is performed based on an identified sub-carrier boundary in a bit table associated with the at least two processing paths such that different target SNR margins and different coding gains are utilized for the plurality of carrier channels carrying information designated by the interface as latency intolerant or error intolerant.

19. The method of claim 1, further comprising determining whether data is latency intolerant, error intolerant, or both latency and error intolerant so that the data is transmitted through an appropriate path among the at least two data paths.

20. A system for performing bit loading, comprising:
means for dividing a communication channel into a plurality of equal bandwidth sub-channels;
means for determining transmission characteristics of each sub-channel;
means for allocating a number of bits for each sub-channel based on the transmission characteristics of each sub-channel, wherein the transmission characteristics comprise a margin associated with each sub-channel, signal-to-noise ratio (SNR) gap, and capacity of each sub-channel;
means for establishing a plurality of different latency data paths using the sub-channels based on an identified boundary in a bit table associated with the data paths, wherein different target SNR margins are associated with the different latency data paths; and
means for simultaneously transferring bits of data over the plurality of different latency data paths, wherein the bits of data are transferred based on whether the bits of data are latency intolerant, error intolerant, or a combination of both.

* * * * *